Dec. 15, 1959     C. J. HARTLEY     2,917,177
APPARATUS FOR REMOVING SLUDGE FROM SLUDGE DRYING BEDS
Filed July 8, 1955     2 Sheets-Sheet 1
FIG. 1.
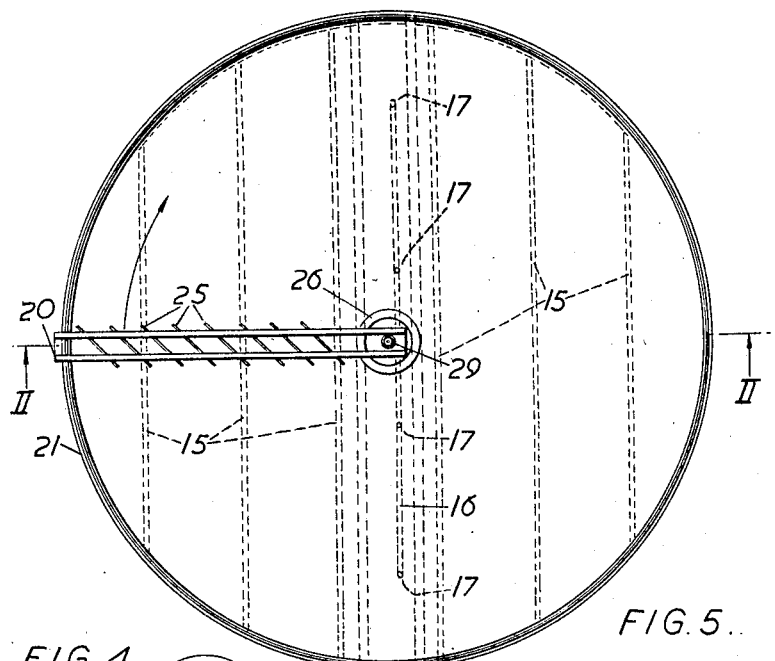
FIG. 4.    FIG. 3.    FIG. 5.
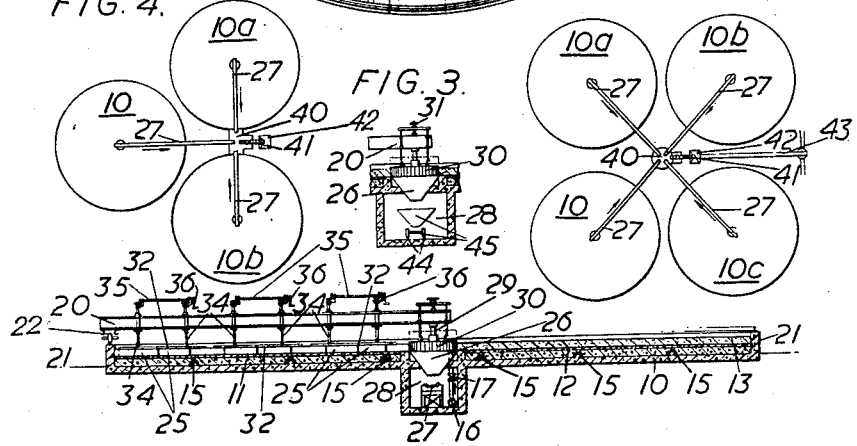
FIG. 2.
CYRIL JOHN HARTLEY
Inventor
Attorney Dec. 15, 1959 C. J. HARTLEY 2,917,177
APPARATUS FOR REMOVING SLUDGE FROM SLUDGE DRYING BEDS
Filed July 8, 1955 2 Sheets-Sheet 2
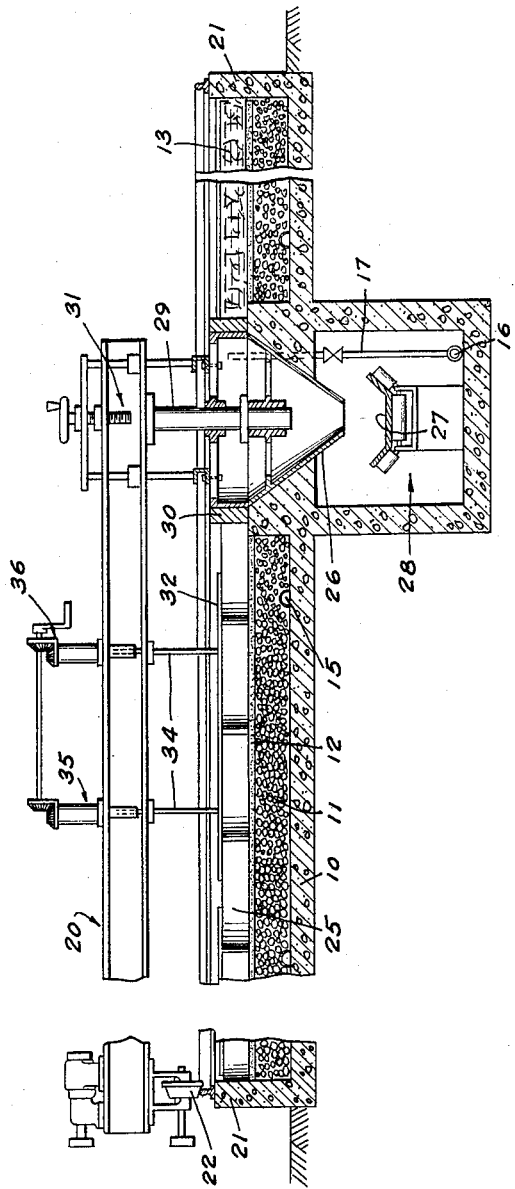
INVENTOR
CYRIL JOHN HARTLEY
BY
ATTORNEY United States Patent Office 2,917,177
Patented Dec. 15, 1959

2,917,177

APPARATUS FOR REMOVING SLUDGE FROM SLUDGE DRYING BEDS

Cyril J. Hartley, Stoke-on-Trent, England

Application July 8, 1955, Serial No. 520,806

1 Claim. (Cl. 210—272)

This invention relates to apparatus for removing sludge from sludge drying beds, and is chiefly intended for use in connection with beds for drying out sludge from sewage treatment plants.

In the known state of the art the sludge is delivered on to rectangular beds in a semi-liquid form, either by gravity or by pumping, usually the latter. The sludge runs on to a layer of sand resting on clinker and under-drains which drain away the liquor from the sludge, leaving it to dry out still further by sun and air. A machine is then made to travel along over the bed, the machine being carried by a travelling gantry spanning the bed, the machine being designed to scoop up and lift the layer of sludge, which is usually about six inches thick, and deposit it into wagons at the side of the bed. This is rather a slow and laborious way of removing the sludge and moreover these travelling machines are rather costly and complicated.

The object of this invention is to provide a more simple and effective arrangement for removing the sludge from sludge drying beds.

Referring to the drawings which form a part of this specification:

Figure 1 is a plan of a sludge drying bed.

Figure 2 is a vertical sectional elevation on line II—II of Figure 1.

Figure 3 is a similar view to Figure 2 but showing only the central portion of the bed, to illustrate a modification.

Figures 4 and 5 are diagrammatic plan views, drawn to a reduced scale, showing lay-outs for three and four beds respectively.

Figure 6 is a vertical sectional elevation on line II—II of Figure 1, similar to but on an enlarged scale to Figure 2.

The sludge bed according to this invention is of circular shape as can be seen in Figure 1, and it comprises, see Figure 2, a floor 10 on which there is a layer of clinker or other porous material indicated at 11. This is covered by a layer of sand 12 on which the layer of sludge 13 which is to be dried is deposited. Drains 15 are provided on the floor 10 under the clinker 11. The sludge to be dried is pumped on to the bed through a feed pipe 16 from below the bed, the feed pipe 16 having a number of vertically extending valve-controlled branches 17 through which the sludge is delivered to different parts of the bed. A rotating bridge spans the bed from the centre to the periphery. The bridge is shown at 20 and may be of any suitable or known type of girder construction and at its outer end it has one or more wheels 22 which rest upon and travel round the top of a circular outer wall 21 surrounding the bed. Scraper blades 25 arranged in echelon, see Figure 1, are carried underneath and along the bridge, the purpose of which is to draw the sludge 13 across towards the centre of the bed, where it is discharged into a depending hopper 26 from whence in turn it is discharged through the open bottom of the hopper on to a travelling conveyor 27 below. This conveyor may be a band conveyor, screw conveyor or of any other suitable or known type. It passes through a tunnel 28 formed below and extending diametrically across the floor of the bed. The bridge 20 is pivoted at the centre about a fixed pivot shaft 29. Rotating cross bridges are well known in sewage treatment plants and are driven in various ways, sometimes at the centre and sometimes at the periphery, and it will be evident that the bridge in my present invention can be driven in any known manner, for instance the bridge might carry an electric motor or diesel engine driving the wheel 22. The upper rim of the hopper 26 is surmounted by a loose encircling ring 30, the depth of which is approximately equal to the depth of the sludge 13 in its wet state on the bed. This ring 30 can be raised and lowered with reference to the upper rim of the hopper 26 by means of suitable screw gearing 31 on the bridge, in order to allow the dried sludge to pass under it and into the hopper when rotation of the bridge commences. The scrapers 25 are arranged in groups, as shown in Figure 2 in three groups, each group being attached to an arm 32, and each arm being separately slung from the bridge by depending rods 34 which enable each group of scraper blades to be raised and lowered separately from the others by means of lifting gear 35 on the bridge, each lifting gear mechanism being preferably hand operated by means of a hand gearing 36. This sectional operation of the scrapers enables the load on the machine to be eased if the sludge should have dried over-hard.

The conveyor 27 delivers the sludge to a suitable receiving hopper for secondary lifting. In Figure 4 a cluster of three beds 10, 10$^a$ and 10$^b$ are shown, and all three conveyors 27 converge to a single hopper 40 from which a bucket elevator or the like 41 raises the sludge and discharges it into a wagon 42. In Figure 5 the cluster comprises four beds, 10, 10$^a$, 10$^b$ and 10$^c$, with the four conveyors 27 converging to a single hopper 40, elevator 41 and wagon 42 as before. The wagons pass to and from the receiving hopper 40 on a suitable track 43, Figure 5.

It will be evident that instead of a travelling conveyor 27 any other suitable transport means for carrying away the sludge may be arranged below the bed; Figure 3 shows a wagon track 44 in the tunnel 28, enabling the sludge to be deposited into wagons, one of which is shown at 45.

The bed is preferably arranged at ground level, necessitating excavation for the tunnel 28 along which the sludge is transported from the central hopper 26. Alternatively however the bed could be raised above ground level by suitable filling, and the tunnel 28 arranged at ground level, which would enable the conveyor 27 to discharge direct into vehicles for more distant transport or the wagons 45 to deliver direct to a dumping ground.

What I claim as new and desire to protect by Letters Patent of the United States is:

A sludge drying bed of circular shape comprising a floor, a layer of porous material on the floor, means for feeding sludge on to the bed, a circular outer wall surrounding the bed, a bridge spanning the bed, wheels on the bridge resting upon and travelling round the wall, scraper blades carried from the bridge, a central pivot for the bridge, means for rotating the bridge about the pivot, a hopper in the centre of the bed, a displaceable ring encircling the hopper, said ring serving when in position to hold wet sludge from falling into the hopper, said scrapers serving when said ring has been withdrawn to move dry sludge from all parts of the bed to the brink of the hopper so that it will fall into the hopper, an open bottom to the hopper, a tunnel under the bed extending from below the hopper to the periphery of the bed, and travelling means in the tunnel movable from the centre to the periphery of the bed and adapted to carry away the sludge discharged into the hopper.

References Cited in the file of this patent

UNITED STATES PATENTS

| | | | |
|---|---|---|---|
| 1,201,014 | Boudwin | Oct. 10, 1916 |
| 1,261,243 | Ketner | Apr. 2, 1918 |
| 1,574,556 | Coe | Feb. 23, 1926 |
| 1,574,557 | Coe | Feb. 23, 1926 |
| 1,574,558 | Coe | Feb. 23, 1926 |
| 2,169,442 | Wuensch | Aug. 15, 1939 |

FOREIGN PATENTS

| | | |
|---|---|---|
| 757,948 | France | Oct. 23, 1933 |